UNITED STATES PATENT OFFICE.

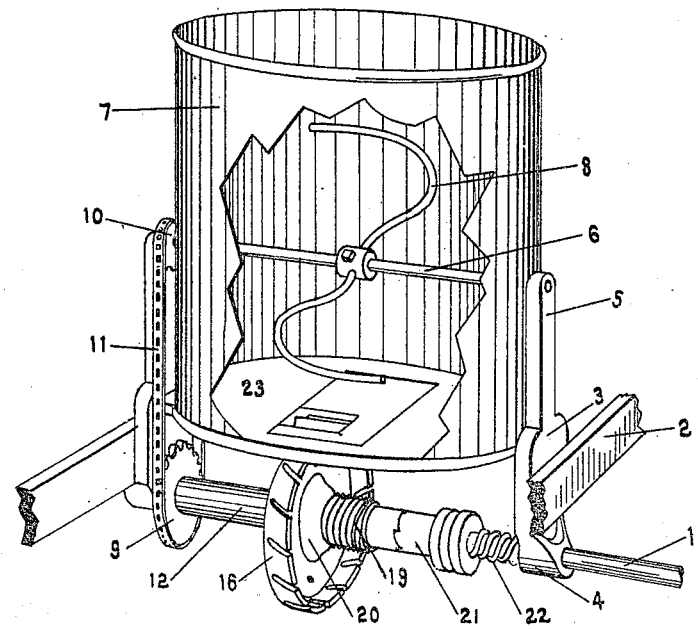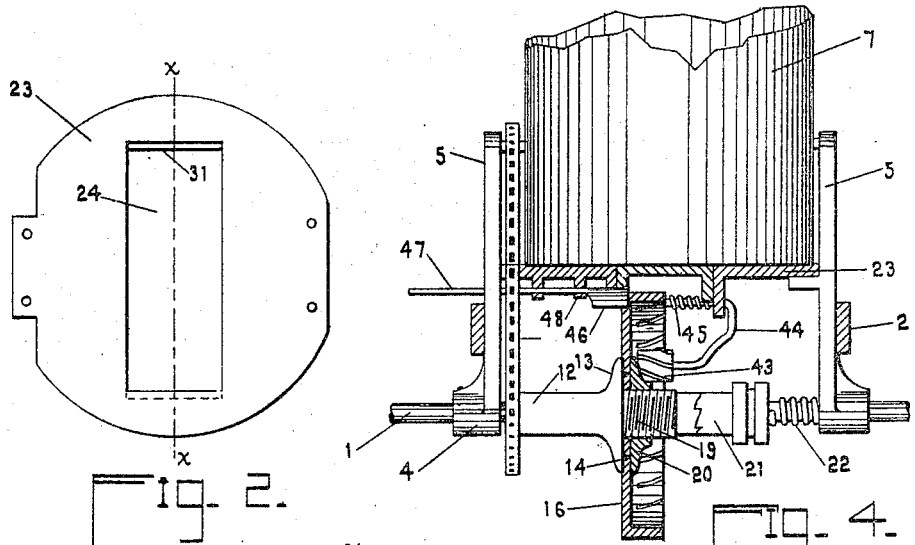

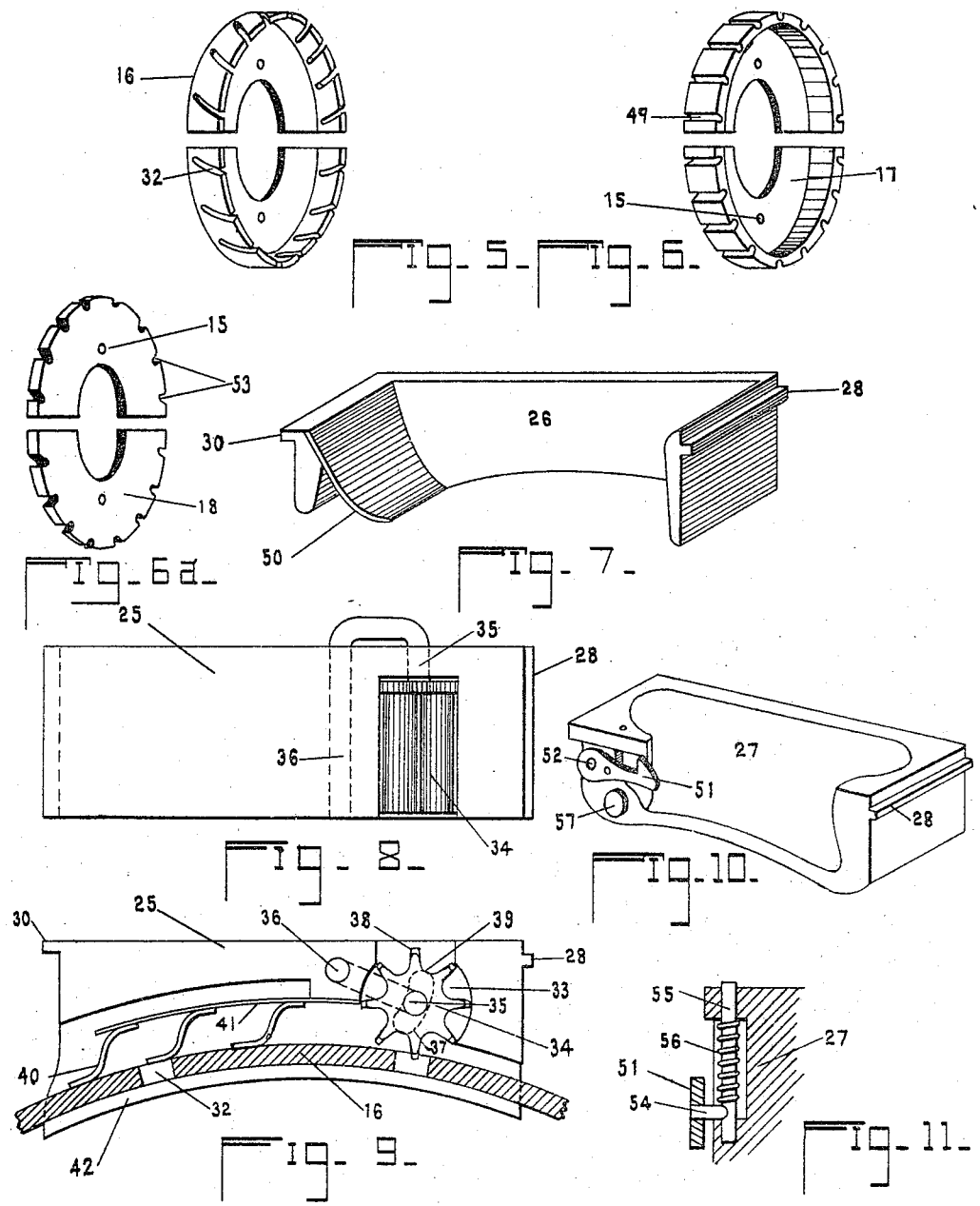

WILLIAM A. WILSON, OF DE LEON, TEXAS.

SEED-PLANTER.

950,086.

Specification of Letters Patent.   Patented Feb. 22, 1910.

Application filed November 18, 1909.   Serial No. 528,678.

*To all whom it may concern:*

Be it known that I, WILLIAM A. WILSON, a citizen of the United States, residing at De Leon, in the county of Comanche and State of Texas, have invented certain new and useful Improvements in Seed-Planters, of which the following is a specification.

My invention relates to new and useful improvements in seed planters. Its object is to provide a seed planter having various attachments by which the device may be adapted to plant corn, cotton, peanuts or other seeds.

A further object is to provide such a seed planter with operating mechanism mounted directly upon an axle, thus avoiding the use of gearing, and securing maximum simplicity.

Finally the object of the invention is to provide a device of the character described, that will be strong, durable, simple and efficient, and comparatively easy to construct, and also one in which the various parts will not be likely to get out of working order.

With these and various other objects in view my invention has relation to certain novel features of construction and operation, an example of which is described in the following specification, and illustrated in the accompanying drawing, wherein:

Figure 1 is a perspective view of the operating mechanism of the planter, showing a portion of the axle, and a portion of the frame mounted thereupon. The seed hopper is in part broken away, revealing the interior construction. Fig. 2 is a top view of the apertured base of the seed hopper. Fig. 3 is a vertical sectional view of said base, taken on the line x—x of Fig. 2. Fig. 4 is a transverse vertical elevation of the feeding mechanism in partial section, the upper portion of the seed hopper being broken away. Fig. 5 is a perspective detail view of a two-part cotton seed feed wheel, the parts of which are adapted to be clamped upon the axle of the planter serving to discharge cotton seed from the hopper. Fig. 6 is a perspective detail view of a similar two-part feed wheel for use in planting peanuts. Fig. 6ª is a perspective view of the two-part feed wheel which is used for planting corn. Fig. 7 is a perspective view of a closure to be placed in the aperture of the hopper base for planting peanuts. Fig. 8 is a top view of another form of closure for the aperture of the hopper base, this form being adapted for planting cotton seed. Fig. 9 is a side elevation of the same. Fig. 10 is still another form of closure for the aperture of the hopper base, adapted for use in planting corn. Fig. 11 is a detail sectional view of the separator upon the corn planter device of Fig. 10. Fig. 12 is a detail side view of the spring pressed plunger employed to eject the corn from the slots of the corn feed wheel.

Referring now more particularly to the drawings, wherein like numerals of reference designate similar parts in all the figures the numeral 1 denotes the axle of the planter mounted on suitable bearing wheels not shown, upon which longitudinal beams 2 are mounted. Brackets 3 support said longitudinal beams above the axle, the lower portions of said brackets being provided with suitable bearings 4, in which the axle turns, and the upper extremities being extended to form bearings 5 for a spindle 6, passing through the seed can or hopper 7, and carrying the two curved wires 8, which agitate the seed and feed it to the discharging mechanism. A sprocket wheel 9 communicates rotation from the axle to a sprocket wheel 10 fast upon the spindle 6, the connection being formed by a chain 11. The sprocket wheel 9 is fast upon one extremity of a sleeve 12, and a clamping plate 13 is positioned upon the other end of the sleeve. The plate 13 is provided upon its side with a plurality of small pegs 14, designed to be introduced into suitable apertures 15 in the feed wheels 16, 17, and 18. These feed wheels are each made in two semi-circular halves, so that they may be easily applied to the axle or removed therefrom. An exteriorly threaded portion 19 of the sleeve 12 is adapted to receive the clamping plate 20, between which and the plate 13, the feed wheel is held firm. A clutch 21, acted upon by a spring 22, engages the toothed inner extremity of the sleeve 12. The lever whereby the clutch teeth may be disengaged is not shown, such construction being well known in the art.

In the base plate 23 of the seed hopper, an aperture 24 is provided, which is adapted to receive any one of the closures 25, 26, or 27 according to the kind of seed to be planted.

A tongue 28 at one end of each closure is adapted to enter a groove 29 in the base plate, and the projection or flange 30 at the other end of each closure is adapted to be seated upon the shoulder 31 of the base plate.

In conjunction with the closure 25 for planting cotton seed, the feed wheel 16 is employed having a laterally extending flange provided with a plurality of oblique slots 32. The closure 25 is provided with a discharge aperture 33, in which is rotatably mounted a grooved feed cylinder 34. This cylinder is journaled upon the arm 35 of a U shaped rod the other arm 36 of which is pivotally mounted transversely of the closure. A slot 37 in the closure allows the feed cylinder 34 a slight freedom of motion vertically, pivoting upon the arms 36. As is shown in Fig. 9, the feed cylinder 34 normally rests upon the rim of the large feed wheel 16, and in the rotation of the latter the teeth 38 upon the cylinder enter the slots 32, causing the feed cylinder to undergo a partial rotation each time one of the slots passes beneath it. Thus the passage of each slot 32 of the feed wheel 16 causes one of the grooves 39 of the feed cylinder to discharge its contents upon the feed wheel. The three small springs 40 attached to the larger spring 41 exert pressure upon the feed wheel 16 as it rotates pressing the seeds into the slots of the wheel. A curved plate 42, projecting from the lower edge of the closure 25, is adapted to contact with the under side of the feed wheel rim preventing the cotton seed from dropping through the slots prematurely. To eject the seed from the slots a toothed cylinder 43 is mounted upon a rod 44, pivoted beneath the base plate of the hopper. A spring 45 is coiled about the rod 44 to hold it in constant contact with the inner surface of the feed wheel rim. The teeth upon the cylinder are so curved as to readily enter the slots of the feed wheel to eject the seed therefrom. In order to limit the number of cotton seed deposited in each hill, a curved guard 46, having a handle 47 is mounted beneath the hopper base, being slidable in the lugs 48. By pushing this guard in, it may be made to cover a portion of the feed wheel flange, permitting the number of seeds entering the slots to be accurately regulated.

For planting peanuts, the closure 26 is placed in the aperture of the hopper base, while the feed wheel 17 is clamped upon the sleeve 12. This feed wheel is provided with a plurality of transverse grooves 49 in its flange, each of which is adapted to receive a peanut. A knife blade 50 is secured to the closure 26 in such a position that if a peanut assumes a vertical position in a slot, it will be cut into by the knife, without destroying either kernel.

For planting corn, the closure 27 illustrated by Fig. 10 is used, in conjunction with the seed wheel 18 illustrated by Fig. 6ª. A separator 51 is pivoted at a point 52 upon the side of the closure 27 to prevent the entrance of more than one grain of corn into the grooves 53 of the wheel 18. An arm 54 projects inwardly from the separator not far from its pivotal point. This arm is rigid with a vertical rod 55, surrounded by a coiled spring 56 which normally holds the separator in contact with the feed wheel. The spring will yield, permitting larger kernels of corn to pass when necessary. The plunger 57 acted upon by a spring 58, acts as an ejector, throwing the kernels from the slots of the feed wheel at the proper point. Any ordinary form of seed boot will serve to conduct the seed from the seed wheel to the ground.

Obviously the seed may be planted any desired distance apart, depending on the diameter of the feed wheel and the number of slots which it contains.

What I claim is:—

1. In a seed planter, the combination with the frame thereof, of a seed hopper carried by the frame, having an apertured base, an apertured closure adapted to be removably secured in the aperture of said base, a seed wheel rotatably mounted beneath said hopper, having a laterally extending flange forming a closure for the aperture of the first named closure, said flange being provided with a plurality of equidistant slots extending obliquely thereacross, means secured to the first named closure adapted to retain the seeds in said slots, means by which the seed are ejected from the slots at a point in their path of rotation, means communicating rotation to said feed wheel from the transporting wheels, and means by which the communication of such rotation may be interrupted.

2. In a seed planter, the combination with the axle thereof, of a seed hopper mounted above the axle, having an apertured base, an apertured closure adapted to be removably secured in the aperture of said base, a feed wheel mounted upon the axle, having a laterally extending flange and forming a closure for the aperture in the first named closure, means secured to the first named closure retaining the seeds in the slots during a portion of each revolution of the feed wheel, and a grooved cylinder rotatably mounted in the aperture of the first named closure adapted to be intermittently rotated by contact with the feed wheel to eject the seed.

3. In a seed planter, the combination with the frame thereof, of a seed hopper carried by the frame, having an apertured base, an apertured closure adapted to be removably secured in the aperture of the hopper base, a feed wheel rotatably mounted beneath the hopper, having a slotted flange overhanging one side, forming a closure for the aperture in the first named closure, means secured to the first named closure retaining the seeds in the slots of the feed wheel during a portion of its rotation and a grooved cylinder mounted in the aperture of the first named closure adapted to be intermittently rotated by contact with the feed-wheel to eject the seed.

4. In a seed planter, the combination with the axle thereof, of a seed hopper mounted above the axle, provided with an apertured base, an apertured closure adapted to be removably secured in the aperture of the hopper base, a two-part feed wheel adapted to be removably clamped upon the axle beneath the hopper, said wheel having a transversely slotted flange, acting as a closure to said aperture in the first named closure a curved projection carried by the first named closure extending beneath the seed wheel flange and adapted to retain the seeds in the slots of the wheel during a portion of the latter's rotation, a rotatably mounted cylinder having longitudinal teeth adapted to enter the slots of the feed wheel during its rotation to eject the seed therefrom a spring tending to hold said cylinder constantly engaging the inner surface of the feed wheel flange, an agitator mounted within the seed hopper, and mechanism communicating rotation to the same from the axle.

In testimony whereof I have signed my name to this specification in the presence of two subscribing witnesses.

WILLIAM A. WILSON.

Witnesses:
A. E. HAMPTON,
EVAN BARKER.